United States Patent [19]
Davidson

[11] Patent Number: 5,688,025
[45] Date of Patent: Nov. 18, 1997

[54] TWO LEVEL CONVERTIBLE CHILD CAR SEAT

[76] Inventor: Timothy H. Davidson, 200 N. Pine St., Little Rock, Ark. 72205

[21] Appl. No.: 763,746

[22] Filed: Dec. 11, 1996

Related U.S. Application Data

[63] Continuation-in-part of Ser. No. 373,094, Jan. 17, 1995, abandoned.

[51] Int. Cl.$^6$ ................................................ B60N 2/28
[52] U.S. Cl. ................................ 297/238; 297/250.1
[58] Field of Search ............................. 297/238, 250.1, 297/256, 256.1, 256.4, 256.15

[56] References Cited

U.S. PATENT DOCUMENTS

| | | | |
|---|---|---|---|
| 294,286 | 2/1884 | Stiles | 297/256 |
| 1,216,287 | 2/1917 | Corbin | 297/256 |
| 3,207,552 | 9/1965 | Loughney, Jr. | 297/250.1 X |
| 5,061,012 | 10/1991 | Parker et al. | 297/256.15 X |

FOREIGN PATENT DOCUMENTS

| | | | |
|---|---|---|---|
| 293132 | 7/1928 | United Kingdom | 297/256 |

*Primary Examiner*—Peter R. Brown
*Attorney, Agent, or Firm*—Jerry L. Mahurin

[57] ABSTRACT

A two level convertible child car seat comprising a frame adapted to be releasably secured to an automobile seat using an existing seat belt, the frame defining a seat to receive a child, and a selectively retractable seat hinged to the frame back the retractable seat folding into and out of a recess. The frame comprises a base, an angled back and a pair of opposite facing sides extending between the base portion and the back portion. A resilient shell is disposed over the frame or the frame and shell is formed from a single piece. The shell defines a child receptive seating area which is padded. The seating area defines a recess which receives the retractable seat when folded. A harness comprised of a torso plate and a set of straps secures the child in the seat.

8 Claims, 5 Drawing Sheets

TWO LEVEL CONVERTIBLE CHILD CAR SEAT

CROSS REFERENCE TO RELATED PATENT APPLICATION

This is a Continuation-In-Part of U.S. patent application Ser. No. 08/373,094, filed Jan. 17, 1995, now abandoned.

BACKGROUND OF THE INVENTION

The present invention broadly relates to automobile safety seats for children. Specifically, the present invention is a Two Level Convertible Child Car Seat. Art pertinent to the subject matter of the present invention can be found in United States Patent Class 297.

As is well known in the art child safety seats are used to secure children safely while riding in automobiles. A problem presented by prior art child safety seat designs is that they do not allow a child to see his or her surroundings well. They position a child in a semi-reclined suitable for sleeping but which restricts their field of vision.

Numerous patents have been issued on child seat related inventions. However, the prior are relating to multilevel seats deal with fitting an adult automobile seat with portions which are intended to fold down to provide a child safety seat and or a related harness. Examples of these built-in child seats are disclosed in Colasanti, U.S. Pat. No. 5,294,182; Dukatz, U.S. Pat. No. 5,106,158; Vander Stel, U.S. Pat. No. 5,100,199; Law, U.S. Pat. No. 4,943,112; Crisp, U.S. Pat. No. 4,900,087; and Vaidya, U.S. Pat. No. 4,596,420.

As is well known in the art there are multiple problems presented to a parent when attempting to use a conventional child safety seat or a built-in child safety seat. It is desirable to provide an improved children's car seat which will aid in keeping children seated and buckled in while traveling in an automobile. Additionally, it is desirous to provide a child's car seat which will allow a child to ride in a more upright, elevated, sitting position.

SUMMARY OF THE INVENTION

My Two Level Convertible Child Car Seat incorporates elements which allow children to ride in a more upright, elevated, sitting position, when not tired or sleepy. Additionally, the present invention can be converted into a conventional car seat when a child is tired or sleepy, to facilitate rest.

My Two Level Convertible Child Car Seat incorporates a retractable seat and harness unit which, when actuated, allows a child to sit safely in a generally upright position when not tired or sleepy. It also incorporates a convertible seat harness unit. When the upper seat is retracted into the body of the seat the child can be positioned in the lower seat. The seat harness unit incorporates a torso safety plate unit which is buckled into the lower portion of the seat or into a buckle associated with the retractable seat.

Therefore, a primary object of the present invention is to provide a two level convertible child car seat.

An object of the present invention is to provide a child safety seat that will allow a child to see his or her surroundings well.

An object of the present invention is to provide a child safety seat which positions a child in an upright seated position.

An object of the present invention is to provide a child safety seat which positions a child in an elevated position.

An object of the present invention is to provide a child safety seat which can be adjusted into a conventional car seat configuration when a child is tired or sleepy, to facilitate rest.

An object of the present invention is to provide a child safety seat which incorporates a retractable seat which when actuated allows a child to sit safely in a generally upright position.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
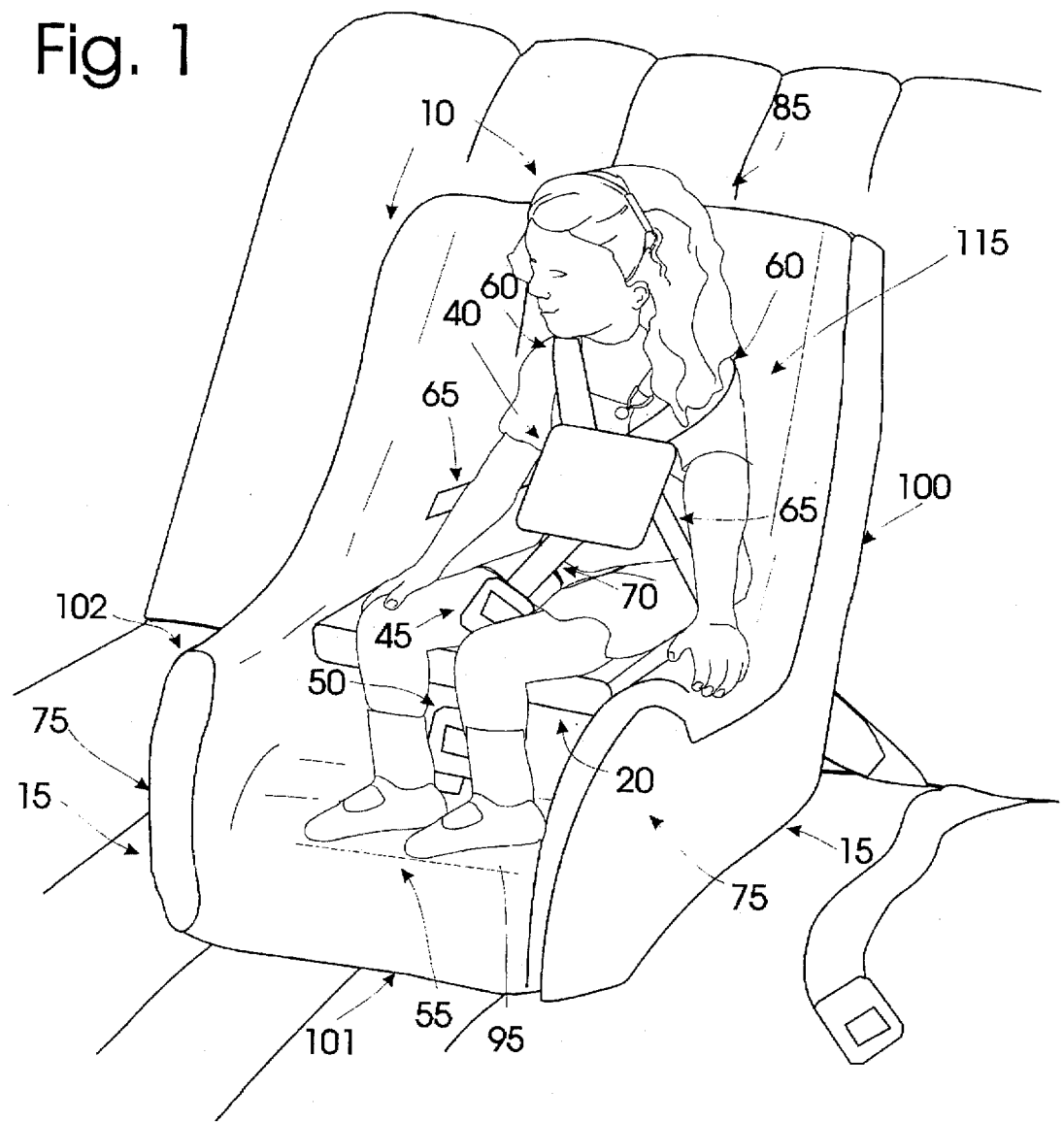
FIG. 1 is an environmental isometric view of a my Two Level Convertible Child Car Seat with the retractable seat deployed and a child seated therein.
Figure 2:
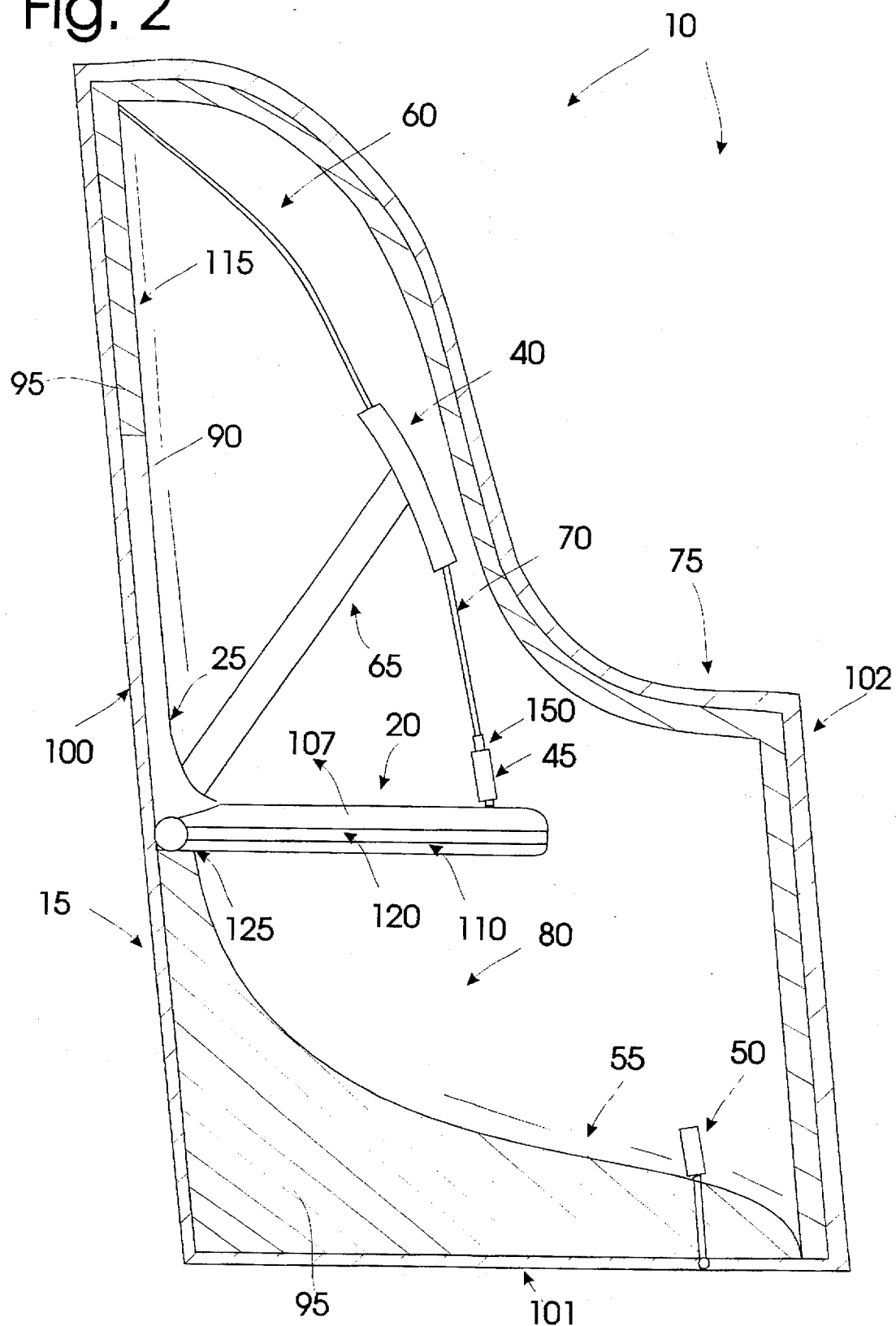
FIG. 2 is a fragmentary side elevational view of my car seat, with the retractable seat deployed.
Figure 3:
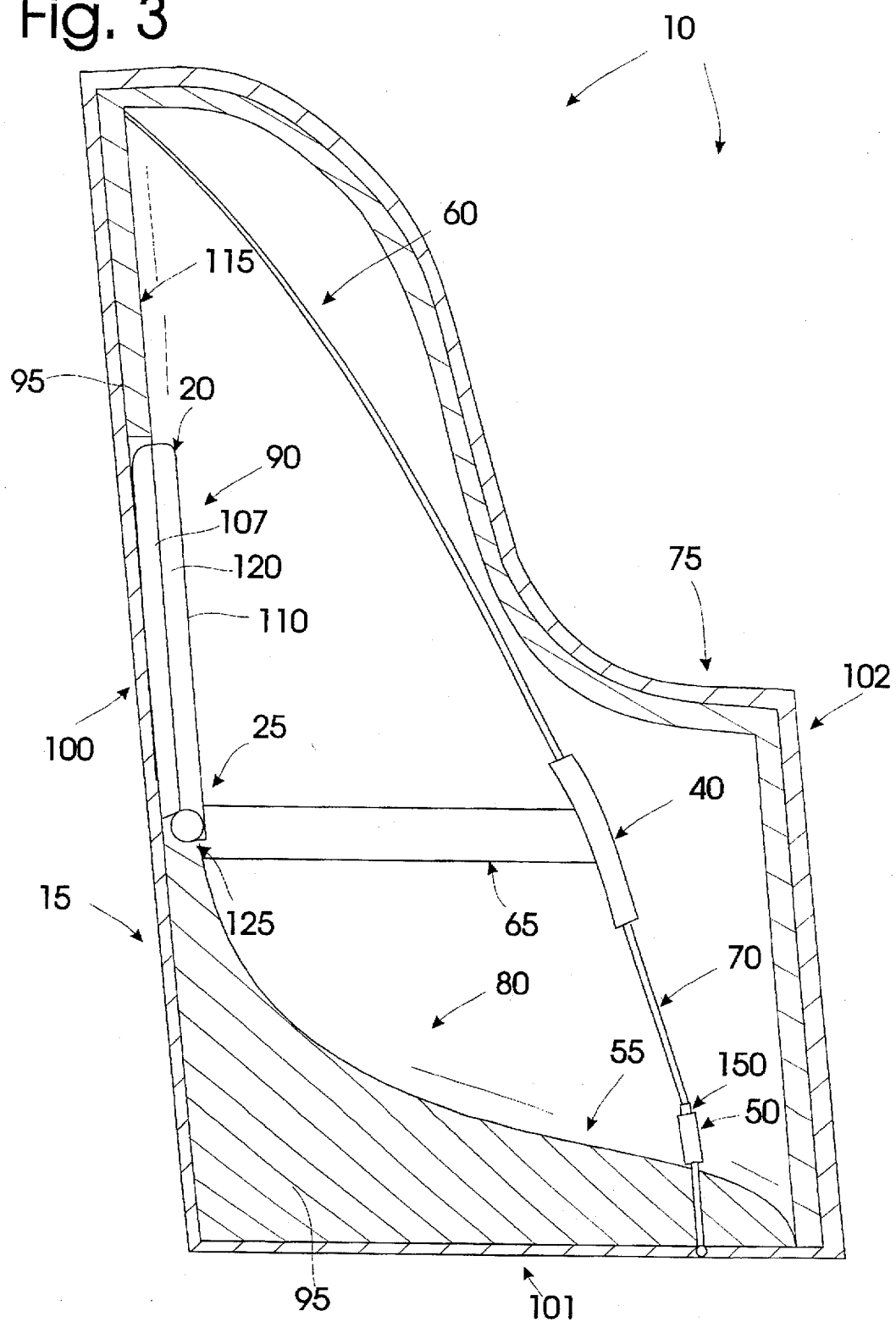
FIG. 3 is a fragmentary side elevational view of my car seat, with the retractable seat retracted.
Figure 4:
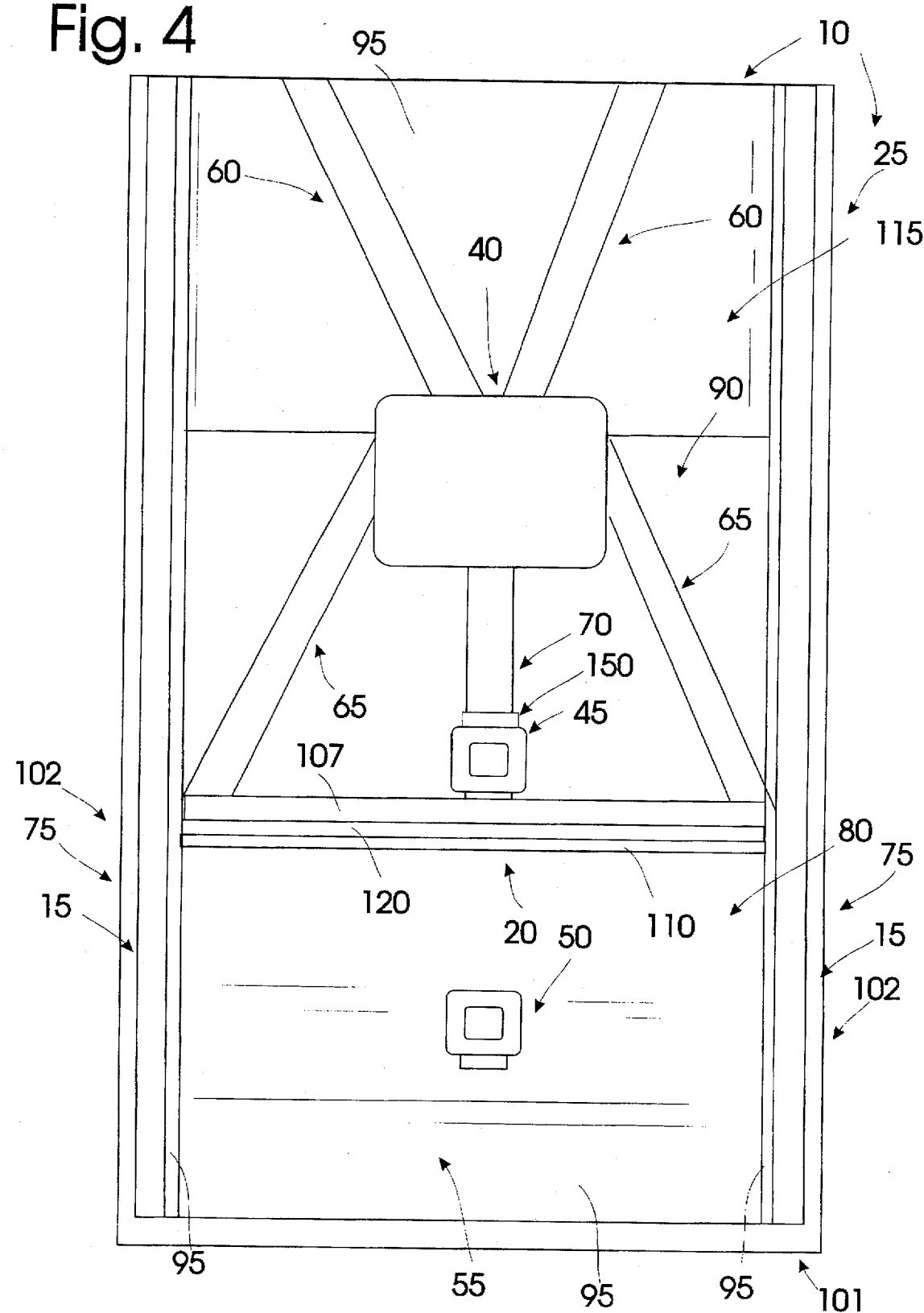
FIG. 4 is a front elevational view of my car seat, with the retractable seat deployed; and, FIG. 5 is a front elevational view of my car seat, with the retractable seat retracted.
Figure 5:
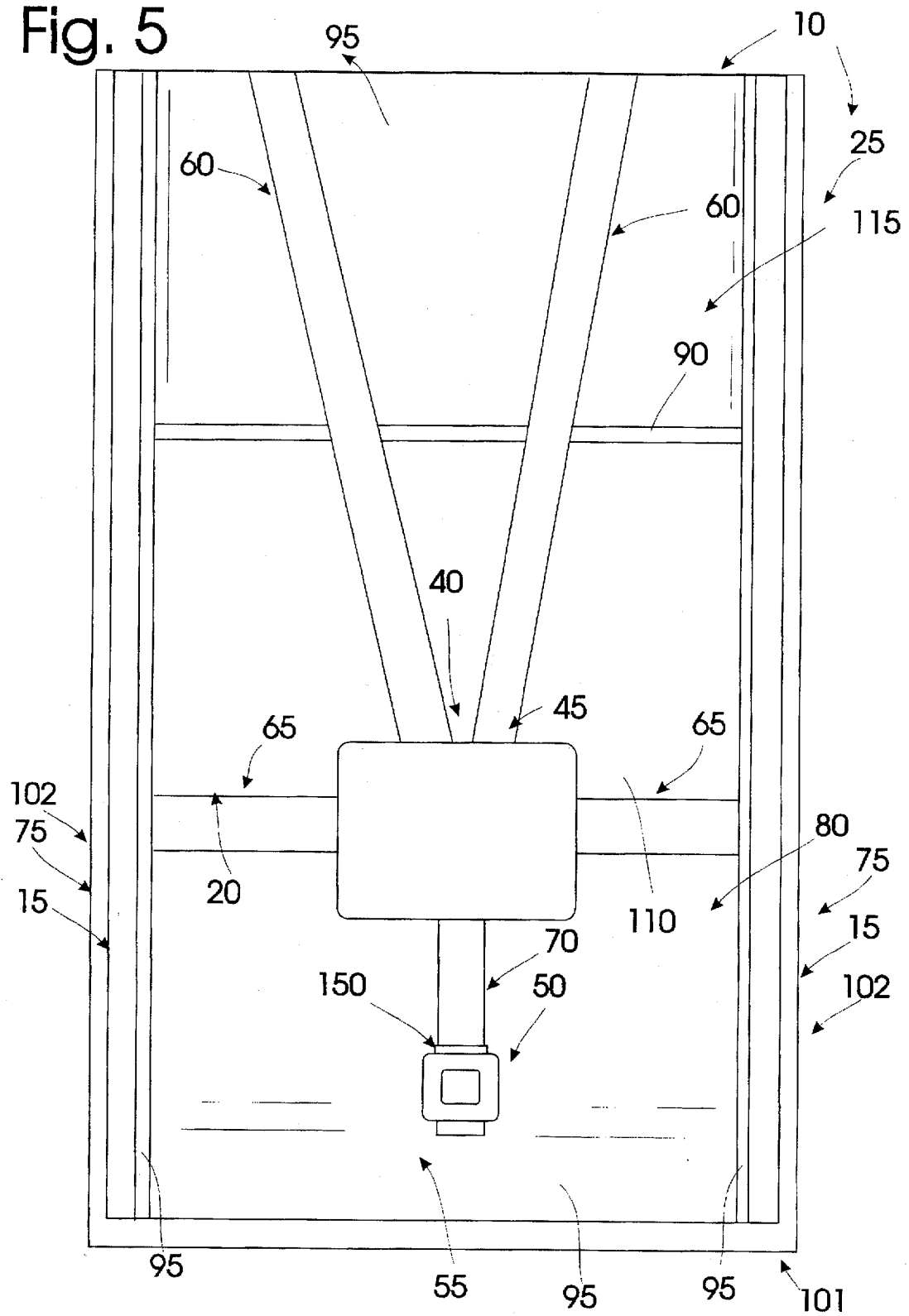

With reference now to the accompanying drawings, the preferred embodiment of my Two Level Convertible Child Car Seat is broadly designated by the reference numeral 10. The seat 10 comprises a frame 15, which may be constructed of molded plastic or rigid tubular material. The components of the seat 10 are secured directly or indirectly to this frame 15. The retractable seat assembly 20 actuates into and out of a back 25 of the seat 10 itself. A torso plate assembly 40 can be releasably secured to lock buckles 45 or 50 in either the retractable seat base 20 or a conventional seat-footrest 55 location, respectively. The straps 60, 65, 70 are anchored behind the seat 10 and pass through slots defined in the upper extent of the seat back 25.

Preferably, a plastic shell 75 or the like is attached to the frame 15 which defines the general shape of the seat 10. As illustrated, the shell 75 and frame 15 can be one piece made of molded plastic. The plastic shell 75 is padded on the interior of the seat 10 and may be more heavily padded in the seating area 80 of the seat's interior. The bottom 55 of the seat 10 on which a child 85 would sit in a conventional car seat is called on to act as a footrest in the present invention. A recess 90 is defined in the padding 95 of the seat back to receive the retractable seat 20 when retracted.

The back portion 100 of the frame 15 provides an anchor point for the retractable seat 20. The frame 15 is also comprised of a base 101 and sides 102. The retractable seat 20 is also padded on both the top 107 and bottom 110. When folded into the recess 90 the retractable seat bottom 110 becomes part of the seat back 115. The retractable seat 20 is comprised of a seat plate 120, mounting the top and bottom padding 105 and 110, and a hinge assembly 125 securing the retractable seat 20 in place.

The torso plate 40 and straps 60, 65 and 70 are used to secure a child 85 in the seat 10. An anchor buckle 50 mounted to the seat frame 15 extends upward from the base 55 of the seat 10. A second anchor buckle 45 extends upward from the retractable seat 20. The second anchor buckle 45 is secured to the retractable seat plate 120. Each of these anchors buckles 40 and 45 are preferable a seatbelt type buckle. A crotch strap 70 extends from the torso plate 40. It has a tab 150 which is received by the buckle 45 or 50. Four other straps 60 and 65 are also secured to the torso plate 40. A pair of shoulder straps 60 adjustably anchored to the frame 15, behind the seat 10, pass through slots defined in the upper portion of the seat 10 and are secured to the upper portion of the torso plate 40. A pair of lap straps 65, also adjustably anchored to the frame 15 behind the seat 10, pass through slots defined in the side corners of the seat 10, near the point where the retractable seat 20 is hinged. These four straps 60 and 65 can be interconnected behind the seat 10 or each may be individually anchored.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense. For example a locking handle bar assembly can be employed which extends across the seat 10. The handle bar would be padded and received by brackets defined by or secured to the seat frame 15.

What is claimed is:

1. A two level convertible child car seat comprising: a frame adapted to be releasably secured to an automobile seat using an existing seat belt, said frame defining a seating area to receive a child, said frame comprising an angled back and a bottom;
   a selectively retractable seat hinged to said angled back of said frame, said retractable seat folding into said back and out of said back spaced apart from and above said bottom, said retractable seat including attaching means thereon;
   a harness secured to said frame and selectively securable to said seat bottom and said retractable seat, said harness comprising at least one strap extending from a torso plate, said torso plate selectively securing to said seat bottom or to said attaching means of said retractable seat.

2. The two level convertible child seat defined in claim 1 wherein said harness comprises shoulder straps extending from said torso plate to an upper portion of said frame and an anchor strap extending downwardly from said torso plate selectively secured to said seat bottom or to said attaching means of said retractable seat.

3. The two level convertible child seat defined in claim 2 wherein said harness comprises at least one lap strap extending from said torso plate to said frame adjacent said retractable seat.

4. A two level convertible child car seat comprising:
   a frame adapted to be releasably secured to an automobile seat using an existing seat belt, said frame defining a seating area to receive a child, said seating area comprising an angled back and a bottom;
   a selectively retractable seat hinged to said angled back, said retractable seat folding into said back and out of said back spaced apart from and above said bottom; said retractable seat including attaching means and,
   a harness secured to said frame and selectively securable to said seat bottom and said retractable seat, said harness comprising:
   a torso plate;
   shoulder straps extending from said torso plate to an upper portion of said frame; and,
   an anchor strap extending downwardly from said torso plate selectively securing to said seat bottom or to said attachment means of said retractable seat.

5. The two level convertible child seat defined in claim 4 wherein said harness comprises at least one lap strap extending from said torso plate to said frame adjacent said retractable seat.

6. A two level convertible child car seat comprising:
   a frame adapted to be releasably secured to an automobile seat using an existing seat belt, said frame defining a seat to receive a child, said frame comprising:
   a base portion;
   an angled back portion extending upwardly and rearwardly from said base portion; and
   a pair of opposite facing side portions extending between said base portion and said back portion, said side portions comprising a relatively wide lower portion extending forwardly from said back portion and upwardly from said base portion, said sides also comprising a relatively narrow upper portion extending forwardly from said back portion and upwardly from said lower portion;
   a resilient shell disposed over said frame, said shell defining a child receptive seating area said seating area comprising a fixed seat back, seat sides and a seat bottom, said seat back defining a recess;
   padding secured to said seating area;
   a selectively retractable seat hinged to said frame back portion, said retractable seat folding into and out of said recess and having attaching means thereon;
   at least one strap for securing said child in said seating area, said strap secured to said frame;
   a torso plate receiving an end of said strap, said torso plate releasably, selectively secured to said frame base portion or to said attachment means of said retractable seat.

7. The two level convertible child seat defined in claim 6 wherein said strap comprises a pair of shoulder straps extending from said torso plate to an upper portion of said frame and an anchor strap extending downwardly from said torso plate selectively secured to said frame base portion or said retractable seat.

8. The two level convertible child seat defined in claim 7 further comprising at least one lap strap extending from said torso plate to said frame adjacent said retractable seat.

* * * * *